(12) United States Patent
Dotzler et al.

(10) Patent No.: US 11,285,846 B2
(45) Date of Patent: Mar. 29, 2022

(54) VEHICLE SEAT WITH SCISSOR FRAME ARRANGEMENT

(71) Applicant: GRAMMER AG, Ursensollen (DE)

(72) Inventors: Florian Dotzler, Hirschau (DE); Konstantin Krivenkov, Amberg (DE)

(73) Assignee: Grammer AG, Ursensollen (DE)

( * ) Notice: Subject to any disclaimer, the term of this patent is extended or adjusted under 35 U.S.C. 154(b) by 0 days.

(21) Appl. No.: 17/118,897

(22) Filed: Dec. 11, 2020

(65) Prior Publication Data
US 2021/0178941 A1    Jun. 17, 2021

(30) Foreign Application Priority Data
Dec. 13, 2019  (DE) .......................... 102019134238.4

(51) Int. Cl.
*B60N 2/00* (2006.01)
*B60N 2/50* (2006.01)
*B60N 2/54* (2006.01)

(52) U.S. Cl.
CPC ............. *B60N 2/502* (2013.01); *B60N 2/508* (2013.01); *B60N 2/54* (2013.01)

(58) Field of Classification Search
None
See application file for complete search history.

(56) References Cited

U.S. PATENT DOCUMENTS

| 3,847,338 A | 11/1974 | Adams |
| 4,095,770 A | 6/1978 | Long |
| 4,645,169 A | 2/1987 | Mischer |
| 4,856,763 A | 8/1989 | Brodersen et al. |
| 5,169,112 A | 12/1992 | Boyles et al. |
| 5,251,864 A | 10/1993 | Itou |
| 5,735,509 A | 4/1998 | Gryp et al. |
| 5,927,679 A | 7/1999 | Hill |
| 5,954,400 A * | 9/1999 | Brodersen ............. B60N 2/505 297/339 |
| 5,957,426 A | 9/1999 | Brodersen |
| 5,975,508 A | 11/1999 | Beard |
| 6,120,082 A * | 9/2000 | Vandermolen ........... B60N 2/02 248/550 |

(Continued)

FOREIGN PATENT DOCUMENTS

| CA | 2800592 A1 * | 6/2013 | ............. B60N 2/525 |
| CN | 204999557 U * | 1/2016 | |

(Continued)

OTHER PUBLICATIONS

Official Action for German Patent Application No. 102019134238.4, dated Aug. 11, 2020, 6 pages.

(Continued)

*Primary Examiner* — Steven M Marsh
(74) *Attorney, Agent, or Firm* — Sheridan Ross P.C.

(57) ABSTRACT

The invention relates to a vehicle seat comprising a vehicle seat upper part and a vehicle seat lower part, which are spaced apart from one another along a height axis Z and are connected to one another by means of a scissor frame arrangement, wherein at least two damping elements are provided between the vehicle seat upper part and the vehicle seat lower part, the at least two damping elements each extending, inclined at an angle of attack α, relative to a first axis parallel to the height axis.

13 Claims, 11 Drawing Sheets

(56) References Cited

U.S. PATENT DOCUMENTS

| | | |
|---|---|---|
| 6,135,225 A | 10/2000 | Barsic |
| 6,366,190 B1 | 4/2002 | Fujita et al. |
| 6,550,740 B1 | 4/2003 | Burer |
| 6,616,117 B2 | 9/2003 | Gryp et al. |
| 7,000,910 B2 | 2/2006 | Oshimo |
| 7,568,675 B2 | 8/2009 | Catton |
| 7,988,232 B2 | 8/2011 | Weber et al. |
| 8,585,004 B1 | 11/2013 | Roeglin et al. |
| 8,800,976 B2 | 8/2014 | Bethina et al. |
| 9,527,416 B2 | 12/2016 | Brodersen |
| 9,644,378 B2 | 5/2017 | Knox |
| 9,694,727 B2 | 7/2017 | Haller et al. |
| 9,758,078 B2 | 9/2017 | Haller |
| 9,809,136 B2 | 11/2017 | Haller et al. |
| 9,937,832 B2 | 4/2018 | Haller |
| 10,012,286 B2 | 7/2018 | Haller et al. |
| 10,583,753 B2 | 3/2020 | Lorey et al. |
| 10,654,381 B2 | 5/2020 | Lorey et al. |
| 2004/0090100 A1 | 5/2004 | Igarashi |
| 2007/0096513 A1 | 5/2007 | Jones et al. |
| 2007/0295882 A1 | 12/2007 | Catton |
| 2009/0134595 A1 | 5/2009 | Haller et al. |
| 2010/0224343 A1 | 9/2010 | Fukuma et al. |
| 2011/0226930 A1 | 9/2011 | Enns et al. |
| 2011/0284713 A1 | 11/2011 | Ellerich |
| 2012/0097822 A1 | 4/2012 | Hammarskiold |
| 2013/0140865 A1 | 6/2013 | Shin |
| 2013/0206949 A1 | 8/2013 | Archambault |
| 2013/0306825 A1 | 11/2013 | Brodersen |
| 2014/0091191 A1 | 4/2014 | Romera Carrion |
| 2014/0131542 A1 | 5/2014 | Hodnefield et al. |
| 2014/0316661 A1 | 10/2014 | Parker et al. |
| 2015/0232004 A1 | 8/2015 | Haller et al. |
| 2015/0232005 A1 | 8/2015 | Haller et al. |
| 2016/0200230 A1 | 7/2016 | Haller |
| 2016/0207430 A1 | 7/2016 | Haller |
| 2016/0214658 A1 | 7/2016 | Haller |
| 2019/0009697 A1 | 1/2019 | Lorey et al. |
| 2020/0108751 A1 | 4/2020 | Dotzler et al. |
| 2020/0122612 A1 | 4/2020 | Fillep et al. |

FOREIGN PATENT DOCUMENTS

| | | | |
|---|---|---|---|
| DE | 2309808 | 9/1973 | |
| DE | 4238733 | 5/1994 | |
| DE | 20101762 | 5/2001 | |
| DE | 102009022328 | 6/2010 | |
| DE | 102015121764 | 8/2017 | |
| DE | 102016120194 | 4/2018 | |
| DE | 102016222800 | 5/2018 | |
| DE | 102018112004 | 11/2019 | |
| DE | 102018124507 | 4/2020 | |
| DE | 102018124512 | 4/2020 | |
| EP | 1863671 | 1/2012 | |
| EP | 2423039 A1 * | 2/2012 | ............ F16F 13/007 |
| EP | 2463146 | 6/2012 | |
| EP | 3181396 | 6/2017 | |
| EP | 3428009 | 1/2019 | |
| FR | 912187 | 8/1946 | |
| GB | 2009881 | 6/1979 | |
| JP | H01-136031 | 9/1989 | |
| JP | H03-220031 | 9/1991 | |
| WO | WO-2006104452 A1 * | 10/2006 | ............ B60N 2/508 |
| WO | WO 2007/058572 | 5/2007 | |
| WO | WO 2009/054788 | 4/2009 | |
| WO | WO 2014/176130 | 10/2014 | |

OTHER PUBLICATIONS

Official Action for German Patent Application No. 102019134244. 9, dated Aug. 11, 2020, 7 pages.
Extended Search Report for European Patent Application No. 20000449.7, dated May 14, 2021, 9 pages.
Extended Search Report for European Patent Application No. 20000446.3, dated May 14, 2021, 8 pages.

* cited by examiner

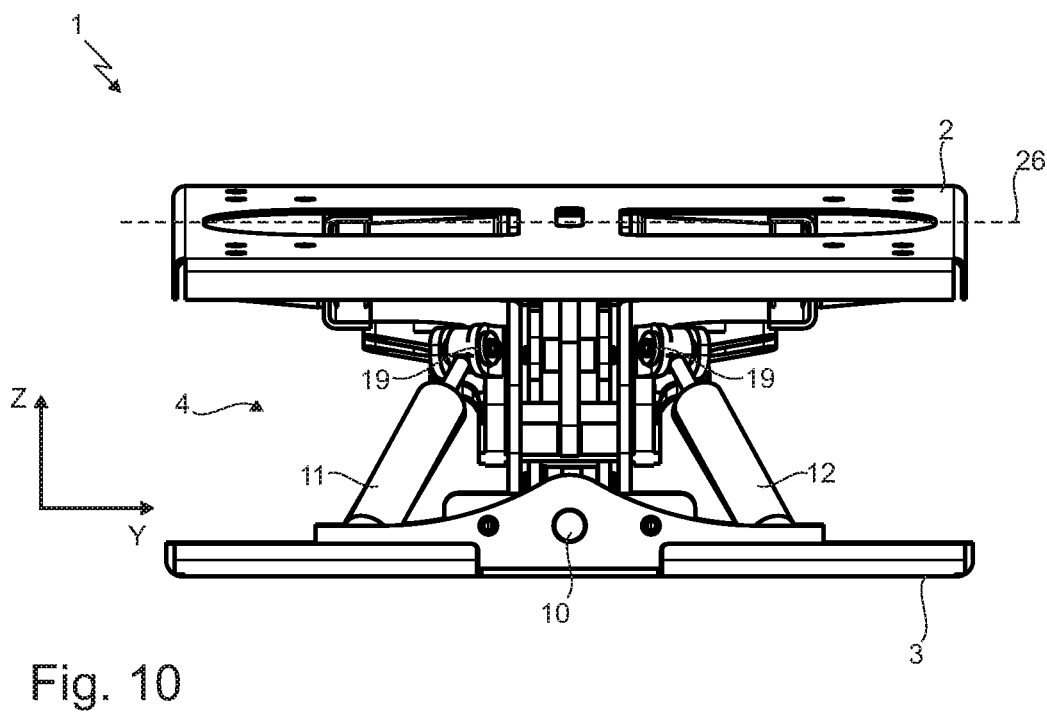
Fig. 10
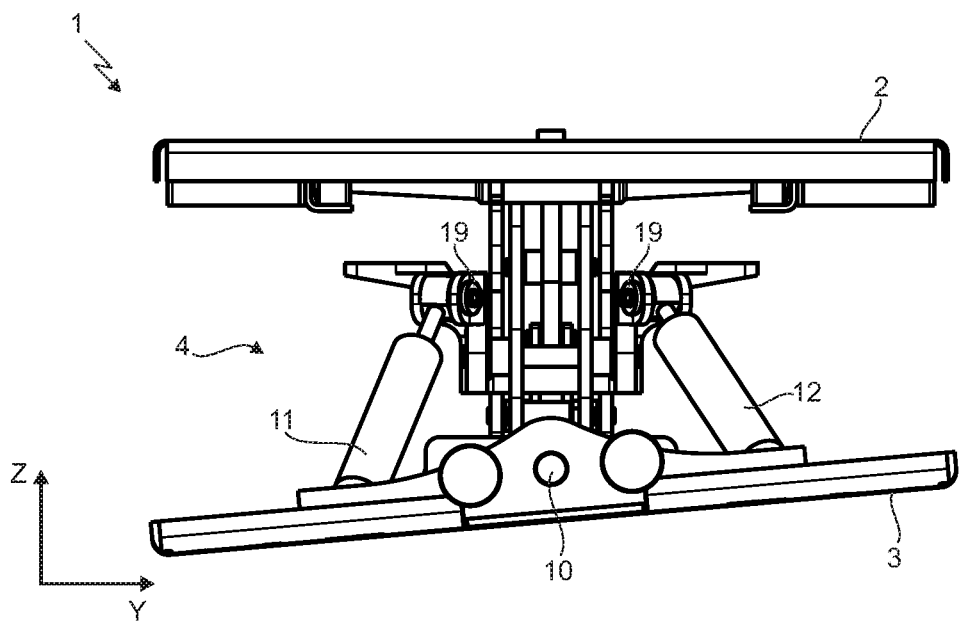
Fig. 11

VEHICLE SEAT WITH SCISSOR FRAME ARRANGEMENT

CROSS-REFERENCE TO RELATED APPLICATION

This application claims the benefit of German Patent Application No. 102019134238.4 filed Dec. 13, 2019, the entire contents of which are incorporated herein by reference.

FIELD

The invention relates to a vehicle seat comprising a vehicle seat upper part and a vehicle seat lower part, which are spaced apart along a height axis Z and are connected to one another by means of a scissor frame arrangement, wherein the scissor frame arrangement comprises at least one inner swinging arm and at least one outer swinging arm.

BACKGROUND

Vehicle seats of this type are provided in particular in commercial vehicles such as tractors, construction machinery, forklifts, lorries, etc. In particular, driver's seats, in which the vehicle driver spends long periods of time, generally have to meet special conditions. The driver of the vehicle is exposed to physical stress due to the effects of vibrations caused by the state of the route. Such vibration effects should be reduced, among other things, by the driver's seat.

Corresponding vibration loads comprise vertical vibrations of the vehicle seat upper part along the height axis Z, rotational vibrations due to a rolling movement of the vehicle seat upper part about the longitudinal axis X, and rotational vibrations due to a pitching movement of the vehicle seat upper part about a width axis Y.

SUMMARY

The object of the present invention is to provide a vehicle seat which allows a reduction in vibration loads and/or vibration isolation for the occupant.

The object is achieved by a vehicle seat comprising a vehicle seat upper part and a vehicle seat lower part, which are spaced apart from one another along a height axis (Z) and are connected to one another by means of a scissor frame arrangement, wherein the scissor frame arrangement comprises at least one inner swinging arm and at least one outer swinging arm, wherein at least two damping elements are provided between the vehicle seat upper part and the vehicle seat lower part, the at least two damping elements each extending, inclined at an angle of attack α, relative to a first axis parallel to the height axis (Z).

With such an inclined arrangement of the at least two damping elements, the angle of attack α is advantageously less than 90°. Therefore, at least one vertical movement of the vehicle seat upper part relative to the vehicle seat lower part is dampened by the at least two damping elements. The kinetic energy is advantageously dissipated during a damping process.

The at least one inner swinging arm and the at least one outer swinging arm are preferably arranged so as to be pivotable relative to the vehicle seat lower part about a third axis of rotation extending along a longitudinal direction. With such an arrangement, the vehicle seat upper part can advantageously perform a rolling movement about the third axis of rotation relative to the vehicle seat lower part or vice versa. This rolling movement can advantageously also be dampened by the at least two damping elements which are arranged so as to be inclined.

The at least one inner swinging arm and the at least one outer swinging arm are advantageously connected by a connecting element which can be rotated about an axis of rotation extending along a width direction (Y) relative to the at least one inner swinging arm and relative to the at least one outer swinging arm. The at least two damping elements are preferably arranged between the connecting element and the vehicle seat lower part. It would also be conceivable that at least two damping elements are arranged between the vehicle seat upper part and the vehicle seat lower part.

Due to the pivotable connection of the at least one inner swinging arm and the at least one outer swinging arm, a pitching movement of the vehicle seat upper part relative to the vehicle seat lower part can advantageously be translated and/or converted into a rotary movement of the connecting element about a first axis of rotation relative to the at least one inner swinging arm and about a second axis of rotation relative to the at least one outer swinging arm. Due to the at least two damping elements which are arranged so as to be inclined, the rotational movement of the first connecting element and thus, due to the existing mechanical coupling, also the corresponding pitching movement of the vehicle seat upper part can be dampened relative to the vehicle seat lower part. A pitching movement is to be understood as a tilting of the vehicle seat upper part relative to the vehicle seat lower part about a pitch axis which extends along the width axis Y. Likewise, the vehicle seat upper part can remain aligned horizontally during a pitching movement and the vehicle seat lower part can tilt about the width axis Y relative to the vehicle seat upper part. To dampen a pitching movement, it would be conceivable to provide the at least two damping elements parallel to the height axis (Z), but this would have a detrimental effect on the suspension stroke along the height axis (Z). This disadvantage is eliminated by the damping element which are arranged so as to be inclined.

In the event of a rolling movement, the vehicle seat upper part pivots relative to the vehicle seat lower part or vice versa about the third axis of rotation. Such a pivoting modifies a lateral distance between the vehicle seat upper part and the vehicle seat lower part, or between the connecting element and the vehicle seat lower part. Due to the inclined arrangement of the damping elements between the vehicle seat lower part and the connecting element, such a rolling movement can also be dampened. To dampen a rolling movement, it would be conceivable to provide the at least two damping elements parallel to the height axis (Z), but this would have a detrimental effect on the suspension stroke along the height axis (Z). This disadvantage is eliminated by the inclined damping element.

Finally, vertical vibrations can be dampened by the damping elements, during which vibrations the vehicle seat upper part is displaced relative to the vehicle seat lower part.

The vehicle seat can preferably also be installed so as to be pivoted about 90° about the Z axis. The pitching movement and/or the pitch axis would thus become the rolling movement or the roll axis and vice versa.

According to a particularly preferred embodiment, four damping elements are provided. Advantageously, four damping elements are arranged between the vehicle seat lower part and the connecting element. In a non-use position of the seat, two damping elements each preferably form the legs of an imaginary trapezoid. The base sides of the imaginary trapezoid are preferably formed by the vehicle seat lower part and by the connecting element. A non-use position of the vehicle seat is to be understood as that position in which no vibrations are introduced, for example an unoccupied vehicle seat in a stationary vehicle. The vehicle seat lower part is advantageously designed to be substantially rectangular. The four damping elements preferably form an imaginary trapezoid along each side of the vehicle seat lower part. The arrangement of the four damping elements in the non-use position can advantageously also be viewed as an imaginary truncated pyramid. A corresponding imaginary rectangular lower base area would then be given by the four lower arrangement points of the damping elements. An advantageous upper imaginary base area would be provided by upper points of arrangement of the damping elements on the connecting element.

According to a further advantageous embodiment, the damping elements are arranged on the vehicle seat lower part so as to be pivotable about a respective pivot axis. The damping elements are preferably arranged on the connecting element so as to be pivotable about a respective further pivot axis. The above-mentioned advantageous lower arrangement points on the vehicle seat lower part can therefore preferably be designed as rotary bearing elements on which the respective damping element is arranged so as to be pivotable. Furthermore, the above-mentioned upper arrangement points on the connecting element can preferably be designed as rotary bearing elements on which the respective damping element is arranged so as to be pivotable. The respective damping element is advantageously connected to the vehicle seat lower part and/or the connecting element by means of a spherical bearing. The respective damper element advantageously has an upper and a lower damper eye, which is preferably designed as a bore or recess. A corresponding pivot bolt can advantageously be arranged in each of these damper eyes, by means of which the respective damping element is connected to the connecting element or the vehicle seat lower part. Furthermore, it is advantageous that a sleeve or bushing made of a resilient material, in which the respective pivot bolt is arranged, is provided in one or more of said damper eyes. Such an advantageous (spherical) bearing allows freedom of rotation due to a resilient deformation of the sleeve or bushing, which is advantageous, for example, if the two pivot axes at the upper and lower end of the damping element are no longer parallel when rotating about the longitudinal axis (X).

According to a further preferred embodiment, the at least one inner swinging arm and the at least one outer swinging arm intersect in an intersection region K. The first axis of rotation and the second axis of rotation are preferably arranged, at least in a non-use position, along the height axis Z above the intersection region K or along the height axis Z below the intersection region K. Advantageously, at least in the non-use position, the connecting element is arranged substantially centrally with respect to a distance between the vehicle seat upper part and the vehicle seat lower part. Accordingly, it is preferred that the at least one inner swinging arm and the at least one outer swinging arm are designed in such a way that, at least in the non-use position, the intersection region is arranged eccentrically with respect to the distance between the vehicle seat upper part and the vehicle seat lower part. The first axis of rotation and the second axis of rotation preferably have, at least in a non-use position, the same distance along the height axis Z to the vehicle seat lower part. Therefore, the connecting element would not be pivoted in the non-use position, whereby the two axes of rotation are arranged at the same height.

According to a further preferred embodiment, the at least one inner swinging arm and the at least one outer swinging arm are each arranged on the vehicle seat lower part by means of at least one lower floating bearing. The at least one inner swinging arm and the at least one outer swinging arm are preferably each arranged on the vehicle seat upper part by means of at least one upper floating bearing. The at least one inner swinging arm or the at least one outer swinging arm are advantageously connected to the vehicle seat lower part by means of a fixed bearing. It is also advantageous in this case that the at least one inner swinging arm or the at least one outer swinging arm are connected to the vehicle seat upper part by means of a further fixed bearing.

According to a further preferred embodiment, during a vertical movement of the vehicle seat upper part relative to the vehicle seat lower part, the connecting element is displaced along the height axis Z. The angle of attack $\alpha$ of the damping elements is preferably dependent on a vertical position of the vehicle seat upper part relative to the vehicle seat lower part. Due to the advantageous pivotable arrangement of the damping elements on the connecting element or the vehicle seat lower part, during a displacement of the vehicle seat upper part or the connecting element in the vertical direction, i.e. along the height axis Z, the angle of attack $\alpha$ is changed. The angle of attack $\alpha$ advantageously extends between a central axis of the respective damping element and the first axis. It is advantageous that the angle of attack $\alpha$ can be different for each damping element. The angle of attack $\alpha$ is advantageously selected from a range between 10° and 80°. The angle of attack $\alpha$ is preferably selected from a range between 15° and 75°. The angle of attack $\alpha$ is more preferably selected from a range between 20° and 70°.

According to a further preferred embodiment, the vehicle seat upper part is tilted about a pitch axis relative to the vehicle seat lower part during a pitching movement. In this case, a rear portion of the vehicle seat upper part can advantageously be tilted upwards or downwards along the height axis Z relative to a front portion of the vehicle seat upper part. The connecting element is advantageously rotated about the first axis of rotation and about the second axis of rotation during this pitching movement. The displacement of the swinging arm ends in the floating bearings preferably takes place on different horizontal planes along the height axis Z.

According to a further preferred embodiment, the at least one inner swinging arm, the at least one outer swinging arm and the vehicle seat upper part are pivoted about the third axis of rotation relative to the vehicle seat lower part during a rolling movement.

Advantageously, the damping elements dampen the vertical movement of the vehicle seat upper part relative to the vehicle seat lower part, the pitching movement of the vehicle seat upper part about the pitch axis relative to the vehicle seat lower part, and the rolling movement of the vehicle seat upper part about the third axis of rotation relative to the vehicle seat lower part. The damper forces are advantageously divided into the respective components (roll, pitch or vertical) depending on the angle of attack $\alpha$.

According to a further preferred embodiment, the lower floating bearings of the at least one inner swinging arm and the at least one outer swinging arm comprise at least one receiving element. The at least one receiving element is advantageously pivotable about the third axis of rotation relative to the vehicle seat lower part. The lower floating bearings preferably comprise bearing rollers. The at least one receiving element is preferably formed as a guide element, in which bearing rollers are guided along the longitudinal direction X.

According to a further preferred embodiment, the scissor frame arrangement comprises two inner swinging arms which form an inner swinging arm pair. The scissor frame arrangement preferably further comprises two outer swinging arms which form an outer swinging arm pair. The two inner swinging arms advantageously have swinging arm ends which are connected by means of a swinging arm bolt. The bearing rollers are preferably arranged on the swinging arm bolt. The two outer swinging arms advantageously have swinging arm ends which are connected by means of a swinging arm bolt. The bearing rollers are preferably arranged on the swinging arm bolt.

According to a further preferred embodiment, a lever arm is provided on the at least one inner swinging arm or the at least one outer swinging arm. The lever arm is advantageously connectable to the at least one outer swinging arm or the at least one inner swinging arm via a second connecting element. The second connecting element is preferably modifiable in its length. The tilting of the vehicle seat upper part about the pitch axis relative to the vehicle seat lower part can preferably be fixed by the length of the second connecting element. For example, an actuator can be provided for the advantageous modification of the length of the second connecting element.

According to a further preferred embodiment, at least one spring element is provided in addition to the damper elements, by means of which a displacement of the vehicle seat upper part relative to the vehicle seat lower part due to the vibration effect can be reset by a vertical movement, a pitching movement, or a rolling movement.

BRIEF DESCRIPTION OF THE DRAWINGS

Further advantages, aims and properties of the present invention will be explained with reference to the following description of the accompanying drawings. Similar components may have the same reference signs in the various embodiments.

In the drawings:

FIG. 10 is a front view of the vehicle seat in accordance with one embodiment after a pitching movement;

FIG. 11 is a front view of the vehicle seat in accordance with one embodiment after a rolling movement;

DETAILED DESCRIPTION

Figure 1:
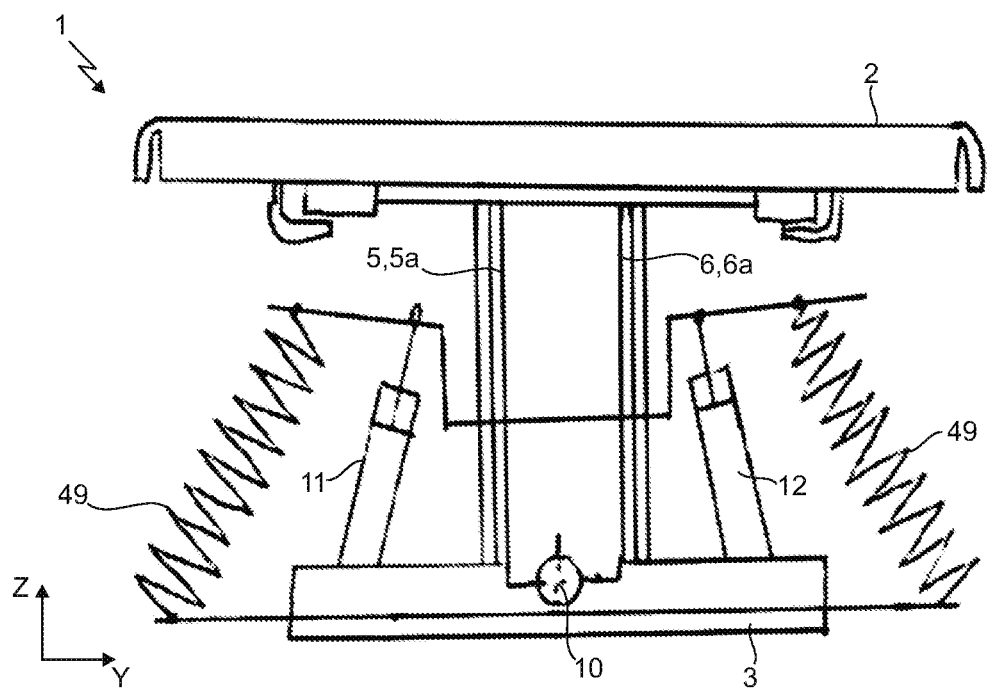
FIG. 1 is an outline sketch of the vehicle seat in accordance with one embodiment.

In FIGS. 1 to 17, a vehicle seat 1 is shown comprising a vehicle seat upper part 2 and a vehicle seat lower part 3, which are spaced apart from one another along a height axis Z and are connected to one another by means of a scissor frame arrangement 4, wherein the scissor frame arrangement 4 comprises at least one inner swinging arm 5, 5a and at least one outer swinging arm 6, 6a, wherein at least two damping elements 11, 12, 13, 14 are provided between the vehicle seat upper part 2 and the vehicle seat lower part 3, the at least two damping elements 11, 12, 13, 14 each extending, inclined at an angle of attack α, relative to a first axis 15 parallel to the height axis Z.

The at least one inner swinging arm 5, 5a and the at least one outer swinging arm 6, 6a are connected by a first connecting element 7 which can be rotated about a first 8 and/or a second axis of rotation 9 extending along a width direction Y relative to the at least one inner swinging arm 5, 5a and relative to the at least one outer swinging arm 6, 6a. The at least one inner swinging arm 5, 5a and the at least one outer swinging arm 6, 6a are arranged so as to be pivotable relative to the vehicle seat lower part 3 about a third axis of rotation 10 extending along a longitudinal direction X. The at least two damping elements 11, 12, 13, 14 are arranged between the first connecting element 7 and the vehicle seat lower part 3.

Therefore, the vehicle seat 1 extends along the height axis Z, the width axis Y and the longitudinal axis X. The vehicle seat comprises other elements such as a seat cushion 35 and a backrest 36, which can be arranged on the vehicle seat upper part 2. This can be seen in FIGS. 2a and 2b. In the remaining drawings, these elements are not shown for reasons of clarity. Further embodiments are also conceivable which comprise further elements, such as armrests. The vehicle seat lower part 3 can be arranged on a vehicle body.

The at least one inner swinging arm 5, 5a and the at least one outer swinging arm 6, 6a intersect in an intersection region K. In this case, the first axis of rotation 8 and the second axis of rotation 9 are arranged, at least in a non-use position, along the height axis Z above the intersection region K or along the height axis Z below the intersection region K. Furthermore, the first axis of rotation 8 and the second axis of rotation 9 are, at least in a non-use position, at the same distance along the height axis Z from the vehicle seat lower part 3. Therefore, the connecting element is not rotated and is aligned so as to be substantially horizontal and/or parallel to the longitudinal axis X. A central axis M can also be defined, which runs through the intersection point K. This is clearly visible in FIGS. 2a and 2b. The first axis of rotation 8 and the second axis of rotation 9 are, at least in a non-use position, at the same horizontal distance from the central axis M. The first connecting element 7 is arranged by means of further connecting elements 42 on the at least one inner swinging arm 5 and/or the at least one outer swinging arm 6. The further connecting elements 42 are suitable for producing a rotatable connection between the first connecting element 7 and the at least one inner swinging arm 5 and/or the at least one outer swinging arm 6. The further connecting elements 42 extend along the first axis of rotation 8 and/or the second axis of rotation 9 and can be designed as bolts or screws. For this purpose, there are corresponding central bearing bores 41 provided in the at least one inner swinging arm 5 and/or the at least one outer swinging arm 6, in which these connecting elements 42 are received.

The at least one inner swinging arm 5, 5a and the at least one outer swinging arm 6, 6a are arranged on the vehicle seat lower part 3 by means of at least one lower floating bearing 20, 21. Furthermore, the at least one inner swinging arm 5, 5a and the at least one outer swinging arm 6, 6a are each arranged on the vehicle seat upper part 2 by means of at least one upper floating bearing 22, 23.

Figure 3:
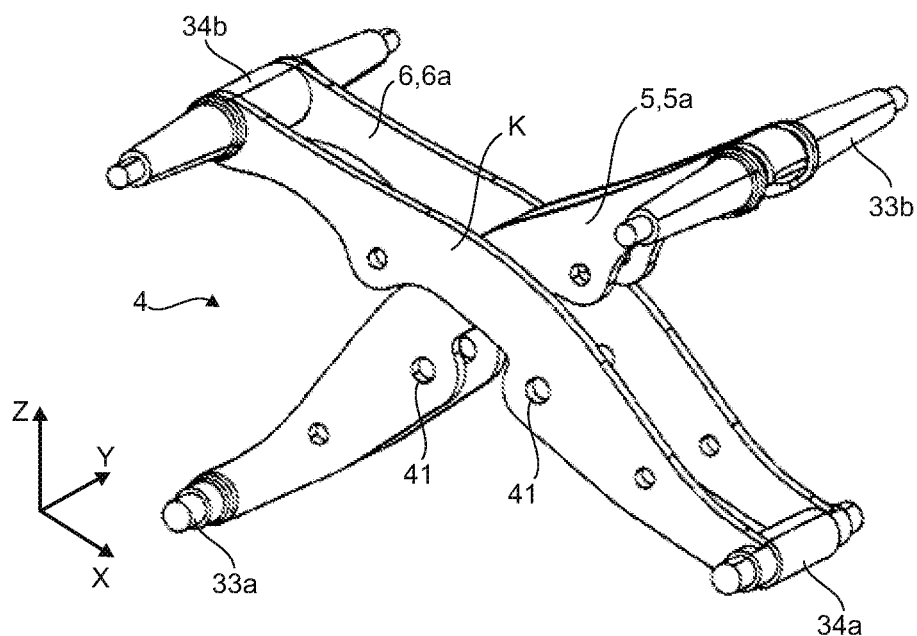
FIG. 3 is a view of the inner swinging arm pair and the outer swinging arm pair.
Figure 4A:
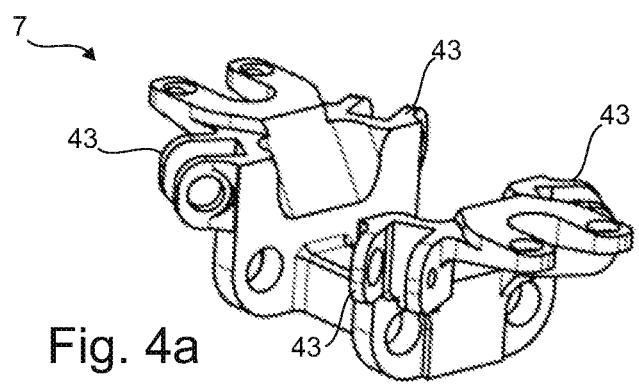
FIG. 4a, 4b are views of the connecting element.
Figure 4B:
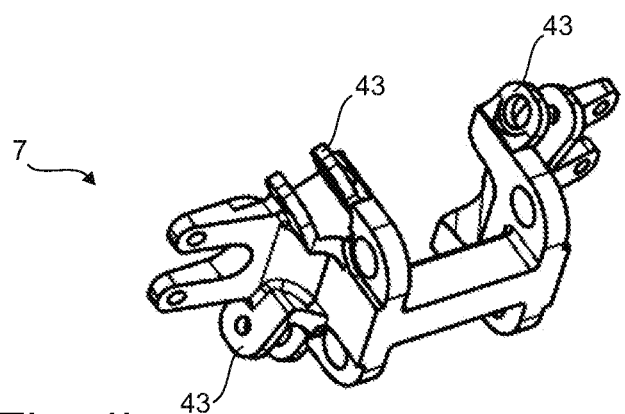
Figure 5:
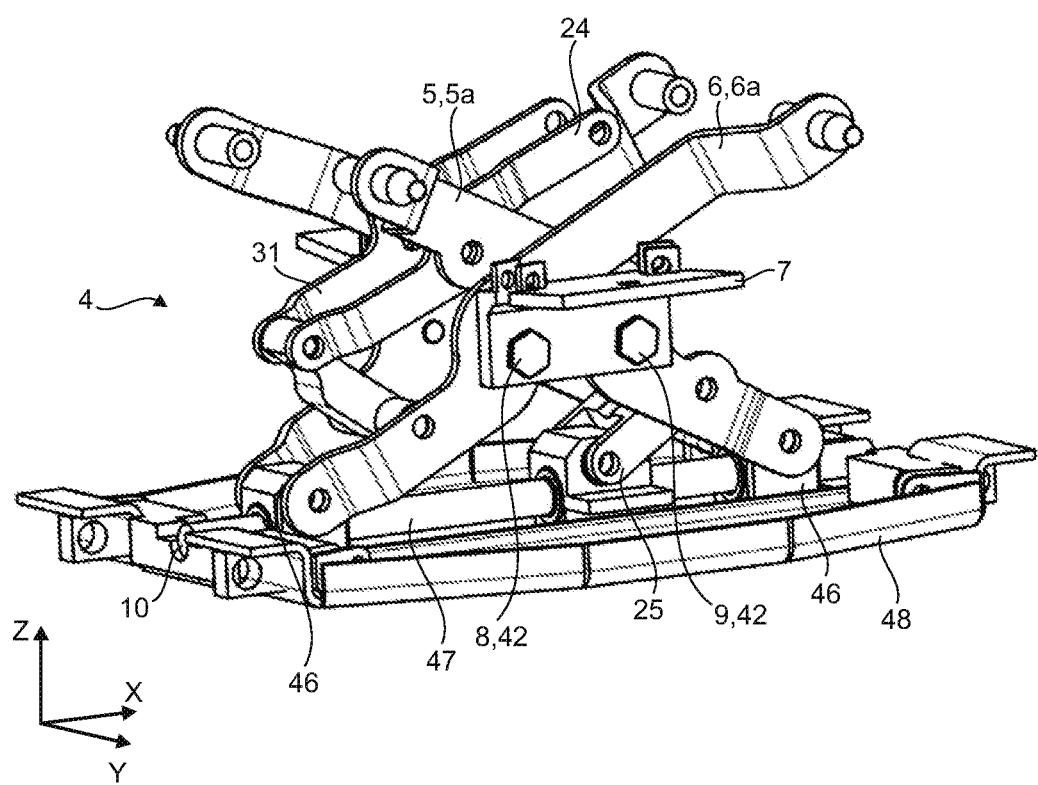
FIG. 5 is a view of the inner swinging arm pair and the outer swinging arm pair in accordance with a further embodiment.

The scissor frame arrangement 4 comprises an inner swinging arm pair 5a and an outer swinging arm pair 6a, as shown in FIGS. 3 and 5 for example. According to the embodiment in FIG. 3, both the inner swinging arm pair 5a and the outer swinging arm pair 6a have a continuous swinging arm bolt 33, 34 at the respective swinging arm ends. The respective bearing rollers 28a, 28b, 29a, 29b are arranged on these swinging arm bolts 33, 34. This is clearly visible by way of example in FIG. 15. The inner swinging arm pair 5a accordingly has an upper swinging arm bolt 33b on which two bearing rollers 29b are arranged in each case, which are associated with the upper floating bearing 23 of the inner swinging arm pair 5a. Furthermore, the inner swinging arm pair 5a has a lower swinging arm bolt 33a on which two bearing rollers 29a are arranged in each case, which are associated with the lower floating bearing 21 of the inner swinging arm pair 5a. The outer swinging arm pair 6a also has accordingly an upper swinging arm bolt 34b, on which two bearing rollers 28b are arranged in each case, which are associated with the upper floating bearing 22 of the outer swinging arm pair 6a. Furthermore, the outer swinging arm pair 6a has a lower swinging arm bolt 34a, on which two bearing rollers 28a are arranged in each case, which are associated with the lower floating bearing 20 of the outer swinging arm pair 6a. Furthermore, the further connecting element 42, by means of which a rotatable connection between the first connecting element 7 and the at least one inner swinging arm 5 and/or the at least one outer swinging arm 6 is established, can be designed as a continuous bolt that extends along the respective axis of rotation 8, 9. Therefore, the first connecting element 7 would be arranged on the at least one inner swinging arm 5 and/or the at least one outer swinging arm 6 by means of two bolts. Furthermore, it would be conceivable that two non-continuous bolts or screws are provided as further connecting elements 42 for each swinging arm pair. Therefore, the first connecting element 7 would be arranged on the at least one inner swinging arm 5 and/or the at least one outer swinging arm 6 by means of a total of four bolts. According to the embodiment in FIG. 5, the further connecting element 42 is designed as a bolt and/or a screw. According to the embodiment in FIG. 12, the further connecting element 42 is designed as a continuous bolt or shaft.

According to the embodiment in FIG. 5, the swinging arm pairs 5a, 6a do not have a continuous swinging arm bolt at the swinging arm ends. Rather, a bearing device for the respective bearing rollers 28a, 28b, 29a, 29b is provided at each swinging arm end which, analogously to the embodiment described in FIG. 3, are associated with the upper floating bearings 22, 23 and/or the lower floating bearings 20, 21.

Figures 2A, 2B:
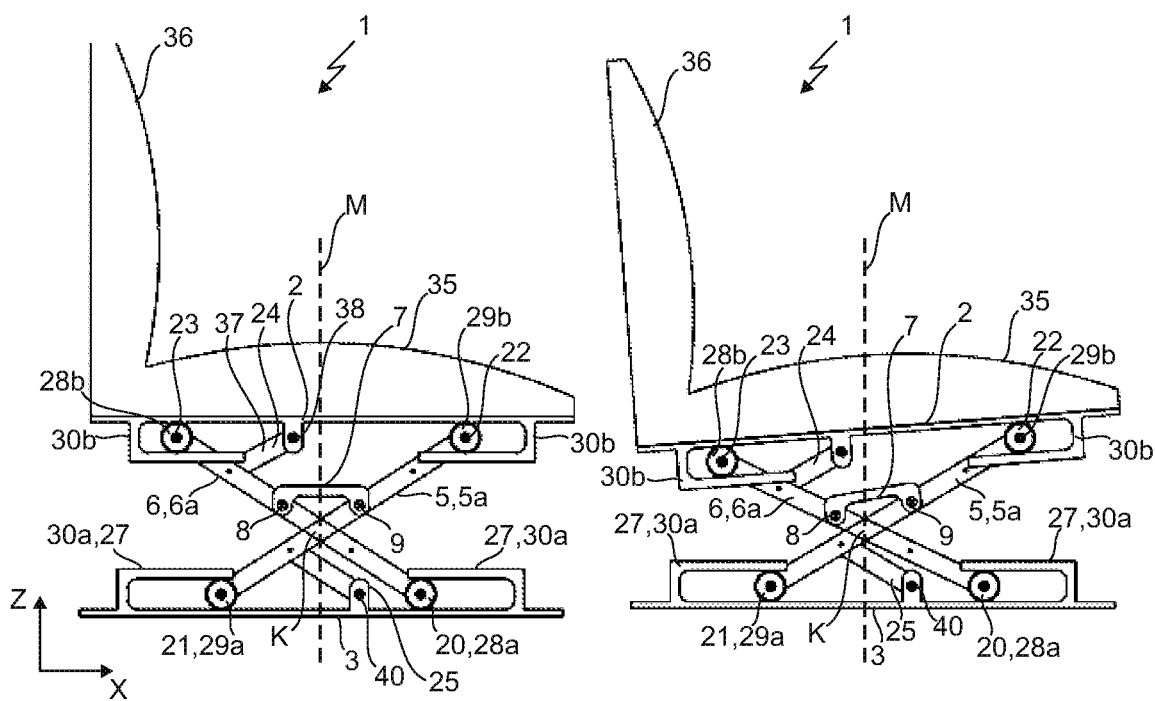
FIG. 2a, 2b are outline sketches of the vehicle seat in accordance with one embodiment.

The upper bearing rollers 28b, 29b are each guided in upper guide elements 30b. The lower bearing rollers 28a, 29a are each guided in lower guide elements 30a. In FIG. 2a, it can also be seen that the lower bearing rollers 28a, 29a are at a smaller distance from the central axis M than the upper bearing rollers 28b, 29b in a non-use position.

Furthermore, the at least one inner swinging arm 5, 5a or the at least one outer swinging arm 6, 6a are connected to the vehicle seat lower part 3 by means of a fixed bearing 24, the at least one inner swinging arm 5, 5a or the at least one outer swinging arm 6, 6a being connected to the vehicle seat upper part 2 by means of a further fixed bearing 25. By providing the fixed bearings 24, 25, an indefinite guidance caused by the provision of the four floating bearings 20, 21, 22, 23 is avoided.

The upper fixed bearing 24 comprises a lever arm which is arranged so as to be rotatable on a rear region along the longitudinal direction X and an upper region of the at least one outer swinging arm 6, 6a along the height direction Z. Therefore, this lever arm 37 is arranged so as to be rotatable on the at least one outer swinging arm 6 between the upper swinging arm bolt 34b and the intersection point K, or the connection of the first connecting element 7 to the at least one outer swinging arm 6, 6a that is rotatable about the first axis of rotation 8. Furthermore, the lever arm 37 is arranged so as to be rotatable on the vehicle seat upper part 2. The lever arm can be pivoted about a fourth axis of rotation 38 relative to the vehicle seat upper part 2. The fourth axis of rotation 38 and the first axis of rotation 8 are advantageously spaced apart from one another along the height axis Z. Furthermore, the fourth axis of rotation 38 and the first axis of rotation 8 are, at least in a non-use position, at the same distance from the central axis M.

The lower fixed bearing 25 also comprises a lever arm which is arranged so as to be rotatable on a rear region along the longitudinal direction X and the lower region of the at least one inner swinging arm 5, 5a along the height direction Z. Therefore, this lever arm 39 is arranged so as to be rotatable on the at least one inner swinging arm 5 between the lower swinging arm bolt 33a and the intersection point K. Furthermore, the lever arm 39 is arranged so as to be rotatable on the vehicle seat lower part 3. The lever arm 39 can be pivoted about a fifth axis of rotation 40 relative to the vehicle seat lower part 3. The fifth axis of rotation 40 and the second axis of rotation 9 are advantageously spaced apart from one another along the height axis Z. Furthermore, the fifth axis of rotation 40 and the second axis of rotation 9 are, at least in a non-use position, at the same distance from the central axis M.

Such a configuration of the floating bearings 20, 21, 22, 23 and the fixed bearings 23, 24 ensures that the intersection point or the first connecting element 7 always remains central due to a lifting movement.

Advantageously, four damping elements 11, 12, 13, 14 are arranged between the vehicle seat lower part 3 and the connecting element 7. In a non-use position of the vehicle seat 1, two damping elements 11, 12, 13, 14 form the legs of an imaginary trapezoid 16. The arrangement of the four damping elements 11, 12, 13, 14 can also be viewed to the effect that, together with a portion of the vehicle lower part 3 and the first connecting element 7, they form an imaginary truncated pyramid 17.

The damping elements 11, 12, 13, 14 are arranged on the vehicle seat lower part 3 so as to be pivotable about a respective pivot axis 18. Furthermore, the damping elements 11, 12, 13, 14 are arranged on the first connecting element 7 so as to be pivotable about a further respective pivot axis 19. This is shown by way of example in FIG. 14. For this purpose, the first connecting element 7 has corresponding receptacles 43, on which the damping elements 11, 12, 13, 14 can be arranged so as to be pivotable. This is clearly visible in FIGS. 4a and 4b. Corresponding receptacles 45 are also provided on the vehicle seat lower part, on which the damping elements 11, 12, 13, 14 can be arranged so as to be pivotable.

Figure 6:
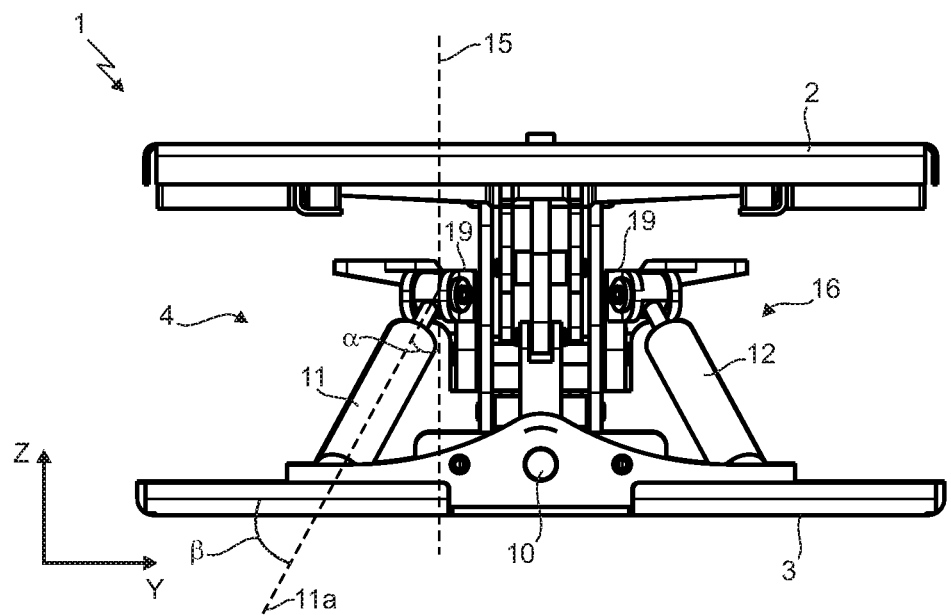
FIG. 6 is a front view of the vehicle seat in accordance with one embodiment in a central position along the height axis Z.
Figure 7:
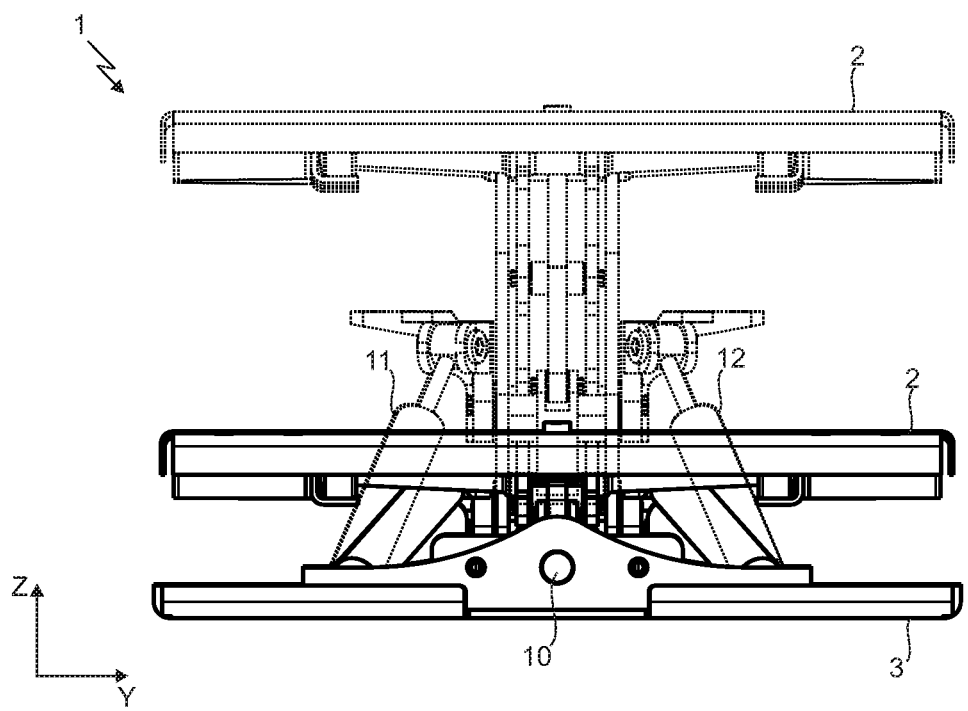
FIG. 7 is a front view of the vehicle seat in accordance with one embodiment in an upper and a lower position along the height axis Z.
Figure 8:
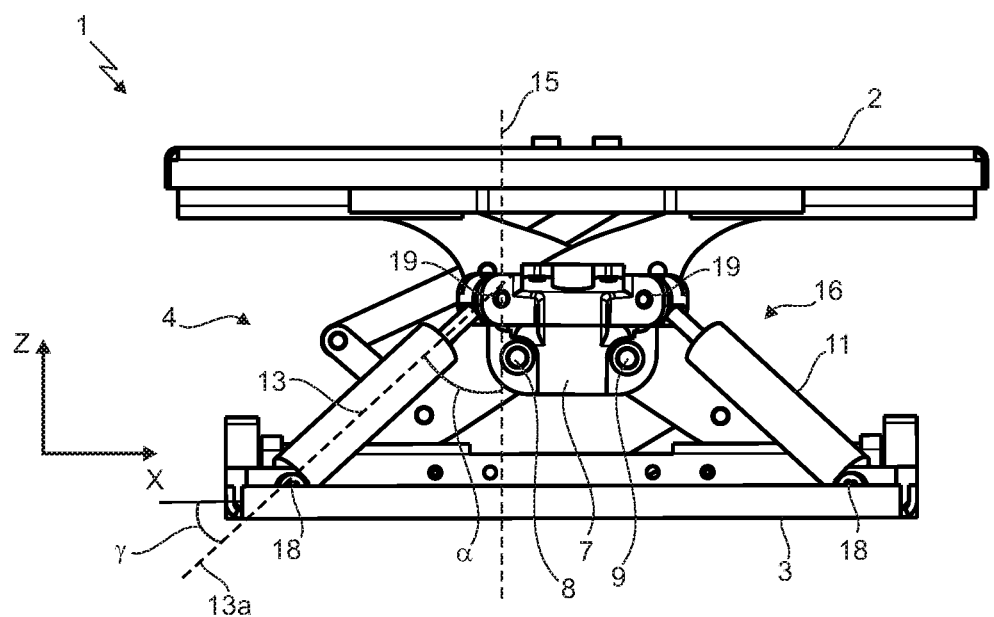
FIG. 8 is a side view of the vehicle seat in accordance with one embodiment in a central position along the height axis Z.
Figure 9:
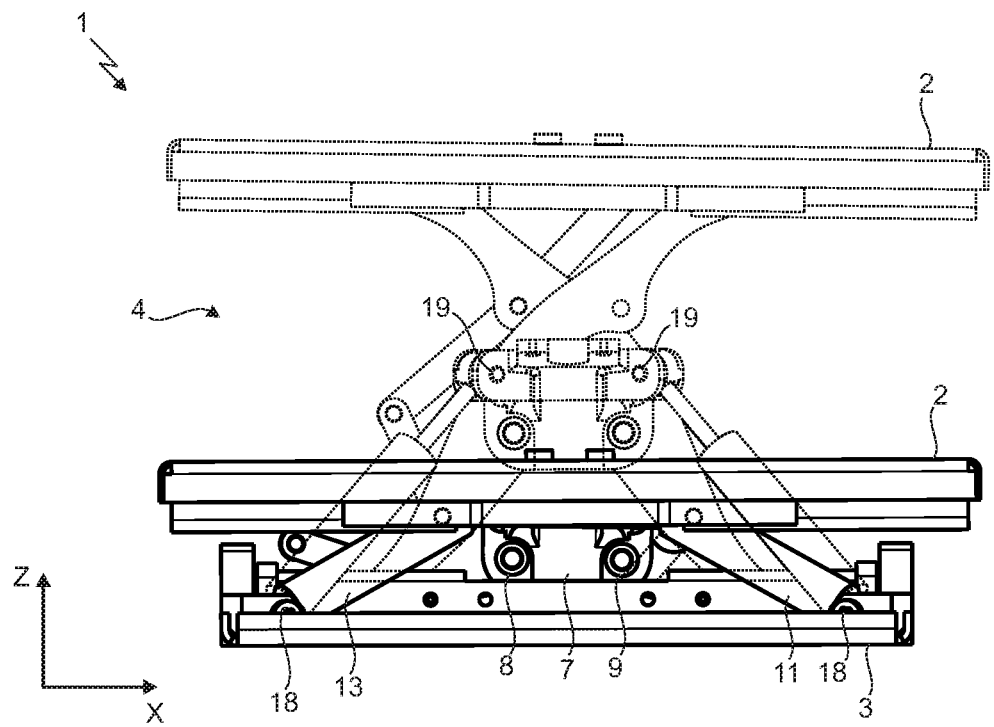
FIG. 9 is a side view of the vehicle seat in accordance with one embodiment in an upper and a lower position along the height axis Z.

During a vertical movement of the vehicle seat upper part 2 relative to the vehicle seat lower part 3, the first connecting element 7 is displaced along the height axis Z; accordingly, all four damping elements 11, 12, 13, 14 are modified in length. Furthermore, with such a vertical movement of the vehicle seat upper part 2 by the pivotable arrangement of the damping elements 11, 12, 13, 14, the angle of attack $\alpha$ of the damping elements 11, 12, 13, 14 is modified accordingly. The angle of attack $\alpha$ extends between a central axis 11a, 12a, 13a, 14a of the respective damping element 11, 12, 13, 14 and the first axis 15. Accordingly, the vertical movement of the vehicle seat upper part 2 is dampened by the damping elements 11, 12, 13, 14. This is clearly visible in FIGS. 6 to 9. FIGS. 6 and 8 show a state in which the vehicle seat is in a central vertical position. Furthermore, a vehicle seat is shown in FIGS. 7 and 9, which is in an upper (represented as a dashed line) and/or in a lower vertical position. The vehicle seat 1 is also shown in the lower vertical position in FIG. 17.

In FIGS. 2b, 10 to 13 and 16, a vehicle seat 1 is shown in which the vehicle seat upper part 2 has experienced a pitching movement relative to the vehicle seat lower part 3. During such a pitching movement, the vehicle seat upper part 2 is tilted about a pitch axis 26 relative to the vehicle seat lower part 3. In the process, a displacement of the swinging arm ends mounted in the upper floating bearings 22, 23 takes place on different horizontal planes along the height axis Z. In addition, the first connecting element 7 is rotated about the first axis of rotation 8 and the second axis of rotation 9. As a result of this rotation of the connecting element, the damping elements 11, 12, 13, 14 are lengthened or shortened in accordance with the direction of rotation. The pitching movement is thus dampened. As can be seen from FIGS. 12 and 13, it is advantageous that the connecting element is tilted and/or rotated in the counter direction relative to the vehicle seat upper part 2. Analogously to this, a pitching movement can also take place in such a way that the vehicle seat upper part 2 retains its horizontal position and the vehicle seat lower part 3 tilts accordingly. Accordingly, the displacement of the axes of the lower floating bearings 20, 21 takes place into other horizontal planes. Analogously, the first connecting element 7 is also rotated about the first axis of rotation 8 and the second axis of rotation 9 in this case. By this rotation of the connecting element, the damping elements 11, 12, 13, 14 are lengthened or shortened in accordance with the direction of rotation. The pitching movement is thus dampened.

In addition to damping the vertical movement of the vehicle seat upper part 2 and the pitching movement, a rolling movement can also be dampened by means of the damping elements 11, 12, 13, 14. For this purpose, the at least one inner swinging arm 5, 5a and the at least one outer swinging arm 6, 6a and the vehicle seat upper part can be pivoted relative to the vehicle seat lower part 3 about a third axis of rotation 10 extending along the longitudinal direction X. Such a rolling movement is shown in FIG. 11. As a result of the pivoting about the third axis of rotation 10, the orientation of the vehicle seat upper part 2 changes relative to the vehicle seat lower part 3. The vehicle seat upper part 2 and the vehicle seat lower part 3 each extend in a starting position in one plane. The plane in which the vehicle seat upper part 2 extends can be described by the vectors A1 and A2. The plane in which the vehicle seat lower part 3 extends can be described by the vectors A3 and A4. In a starting position in which the vehicle seat upper part 2 and the vehicle seat lower part 3 are arranged parallel to one another, the vectors A2 and A4 would be parallel to the width axis Y and the vectors A1 and A3 would be parallel to the longitudinal axis X. In the event of a rolling movement, the vectors A2 and A4 have an angle $\theta \neq 0°$, 180°. This is shown, for example, in FIG. 11, the vectors A1 and A3 being directed into the plane of the drawing. In the event of a rolling movement, a distance changes between a pivot axis 19 with respect to an upper connection of a damper element 11, 12, 13, 14 to the first connecting element 7 and between a pivot axis 18 with respect to a lower connection of a damper element 11, 12, 13, 14 to the vehicle seat lower part 3. Therefore, the damper elements 11, 12, 13, 14 are shortened or lengthened accordingly, as a result of which the rolling movement is dampened.

Figure 15:
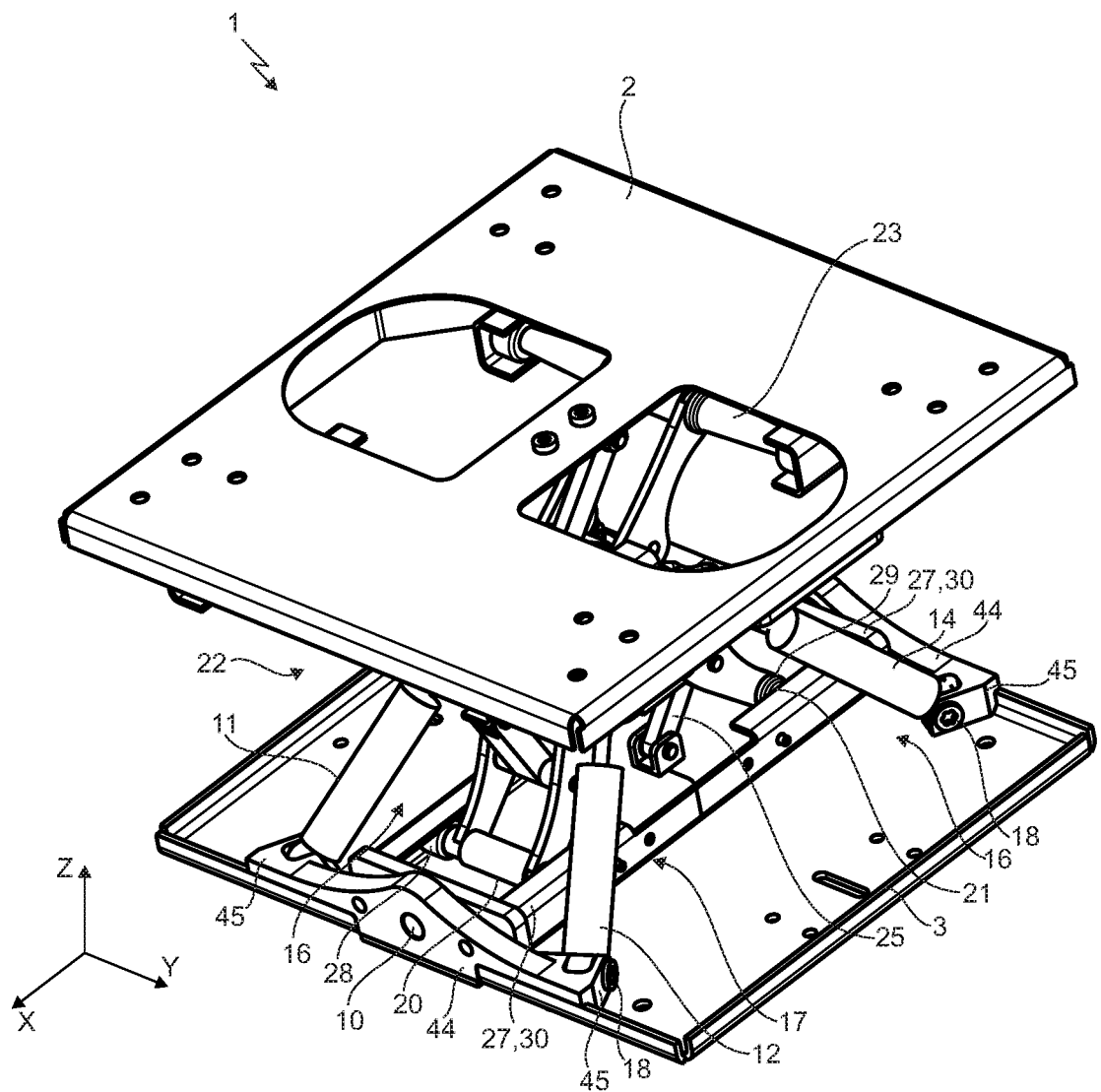
FIG. 15 is an isometric view of the vehicle seat in accordance with one embodiment.
Figure 16:
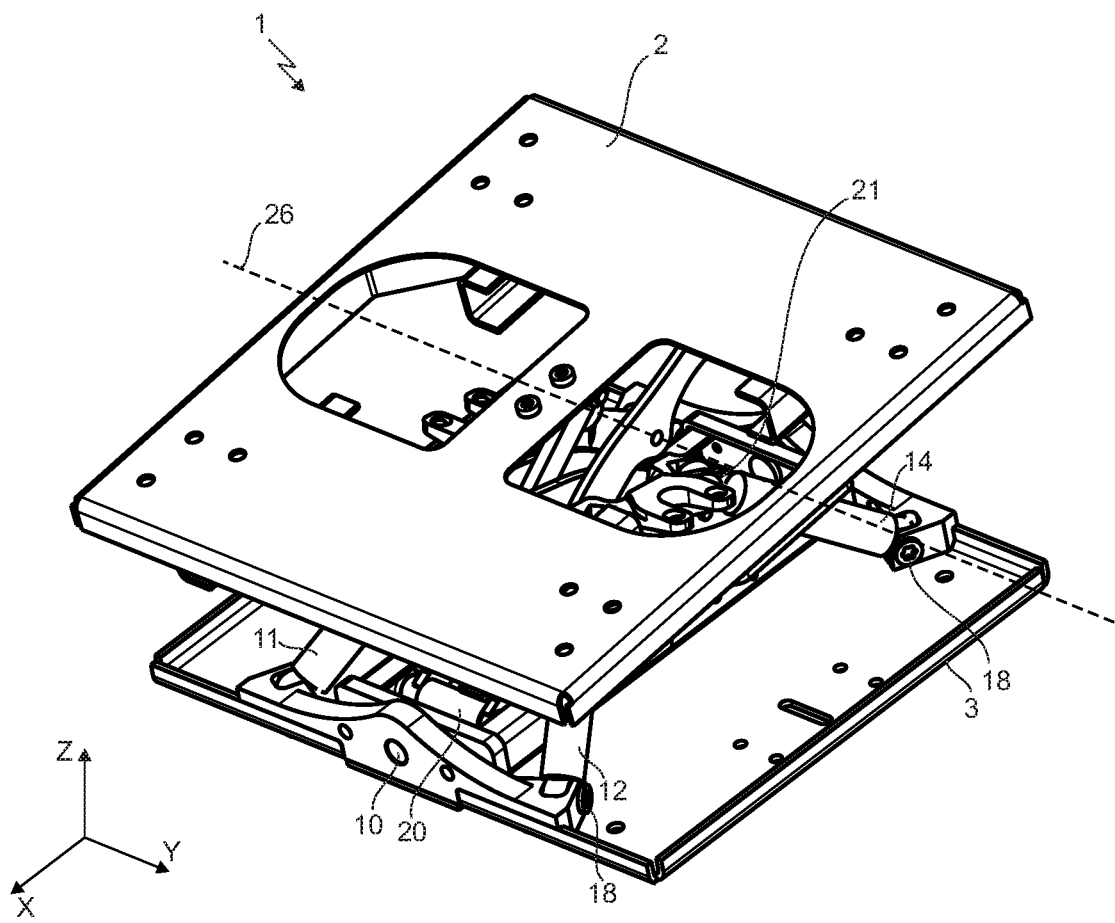
FIG. 16 is an isometric view of the vehicle seat in accordance with one embodiment after a pitching movement.
Figure 17:
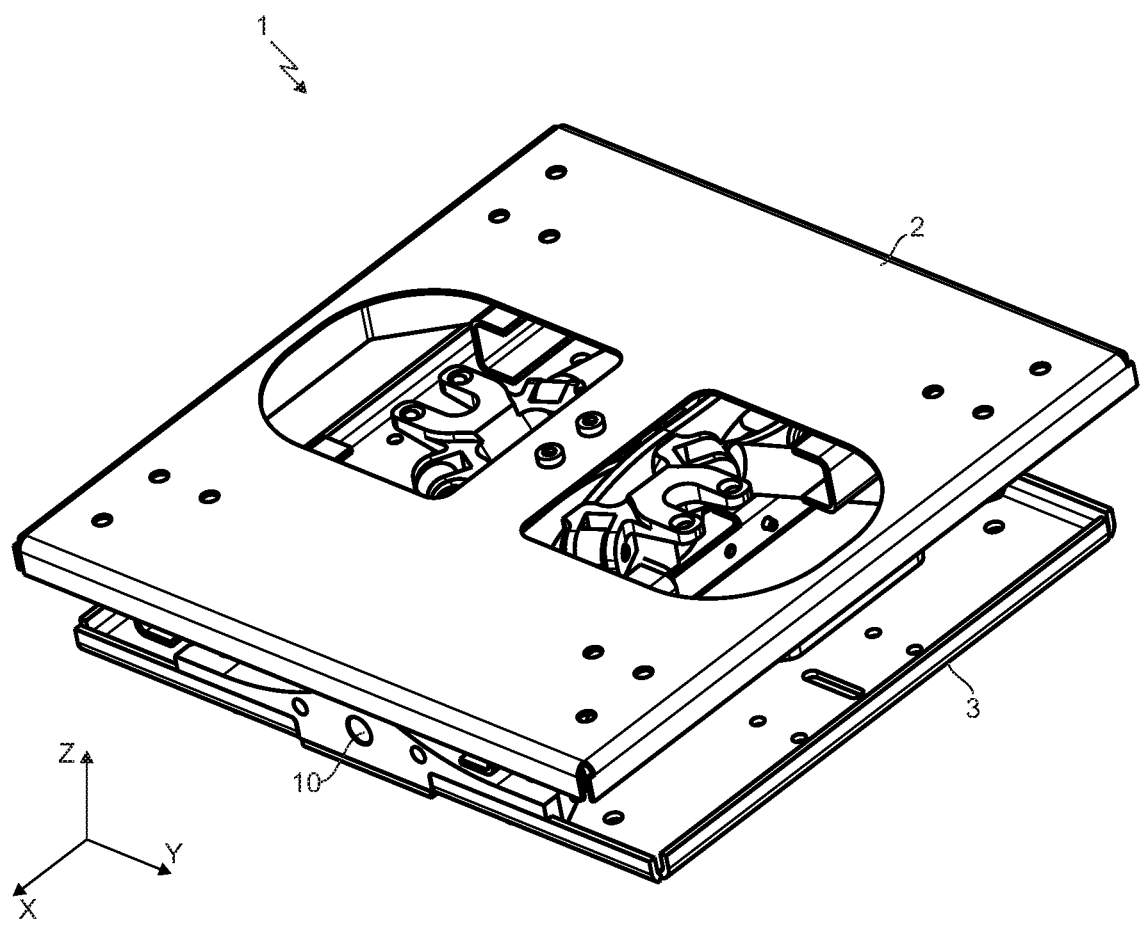
FIG. 17 is an isometric view of the vehicle seat in accordance with one embodiment in a lower vertical position.

The lower floating bearings 20, 21 of the at least one inner swinging arm 5, 5a and the at least one outer swinging arm 6, 6a comprise at least one receiving element 27 which is pivotable about the third axis of rotation (10) relative to the vehicle seat lower part (3). FIG. 15 shows an embodiment in which the receiving element 27 and guide element 30a is formed in which the lower bearing rollers 28a, 29a are guided. The guide element is designed as a substantially plate-like element which extends along the longitudinal extent of the vehicle seat lower part 3 and is arranged substantially centrally thereon. The vehicle seat lower part 3 has a fastening element 44 on each of its two longitudinal sides. On this fastening element 44, the guide element 30a is mounted so as to be rotatable about the third axis of rotation 10, in each case by means of a rotary bearing. The receptacles 45, on which the damping elements 11, 12, 13, 14 are arranged so as to be pivotable, are also arranged laterally on the fastening element 44 or are integrated therein. The lower fixed bearing 24 is also arranged on the plate-like element.

According to the embodiment according to FIG. 5, no lower bearing rollers 28a, 29a are provided. The at least one inner swinging arm 5, 5a and the at least one outer swinging arm 6, 6a are connected in each case to a sliding element 46, which can slide along the longitudinal direction X on a continuous sliding rail 47. The sliding rail 47 is connected to the holding element 48 and extends along the third axis of rotation 10. In the event of a rolling movement, the sliding elements 46 can be rotated about the third axis of rotation 10 and/or the fixed sliding rail 47. In a further embodiment (not shown in this case) the sliding rail is designed as a torque-transmitting square shaft. This square shaft is then mounted so as to be rotatable on the holding element 48 or the receptacles thereof. In this embodiment, it then applies that the sliding elements 46 execute the x movement on the sliding rail 47 and the rolling movement is realised by rotating the sliding rail 47.

Furthermore, this sliding rail 47 can be pivoted about the third axis of rotation 10 relative to a holding element 48 which can be fastened to the vehicle seat lower part 3. The lower fixed bearing 24 is also connected to the sliding rail 47.

In FIG. 6, the front view of the vehicle seat 1 is shown. A projected angle of attack β is also shown. The projected angle of attack β in the plane of the front view mainly determines the division of the damper forces into the components about a roll axis or about the third axis of rotation 10 and in the vertical direction. A side view of the vehicle seat 1 is shown in FIG. 8. Furthermore, a projected angle of attack γ is shown. The projected angle of attack γ in the plane of the side view mainly determines the division of the damper forces into the components about the pitch axis and in the vertical direction. Therefore, it can be seen that the damper forces of the damping elements 11, 12, 13, 14 are divided into the respective components with regard to a rolling movement, a pitching movement and a vertical movement, depending on the angle of attack α.

Figure 12:
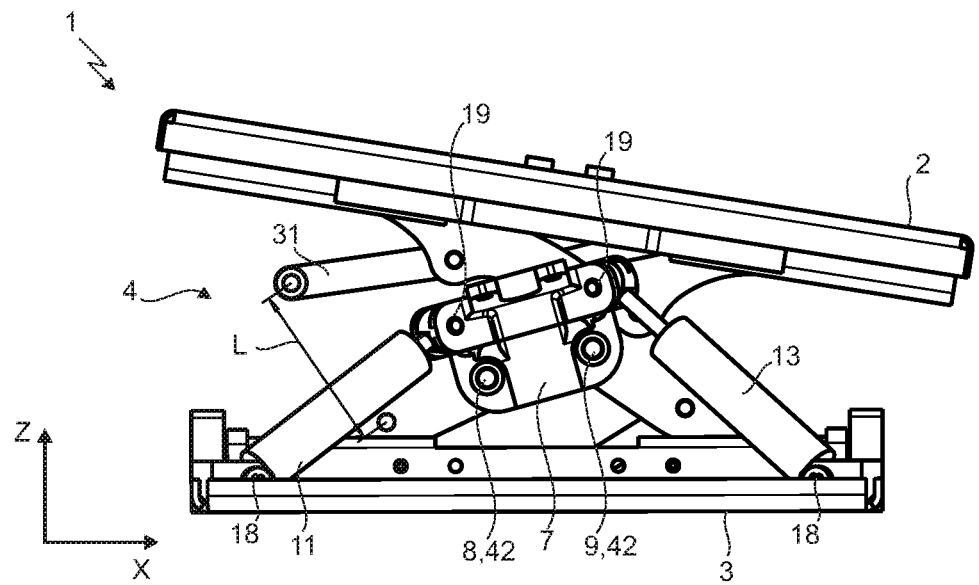
FIG. 12 is a side view of the vehicle seat in accordance with one embodiment after a pitching movement.
Figure 13:
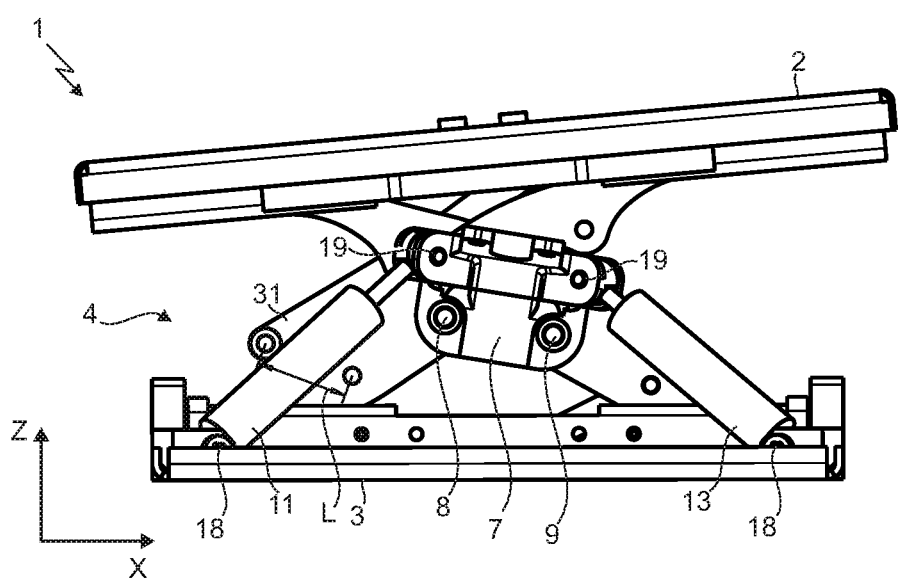
FIG. 13 is a side view of the vehicle seat in accordance with one embodiment after a pitching movement.
Figure 14:
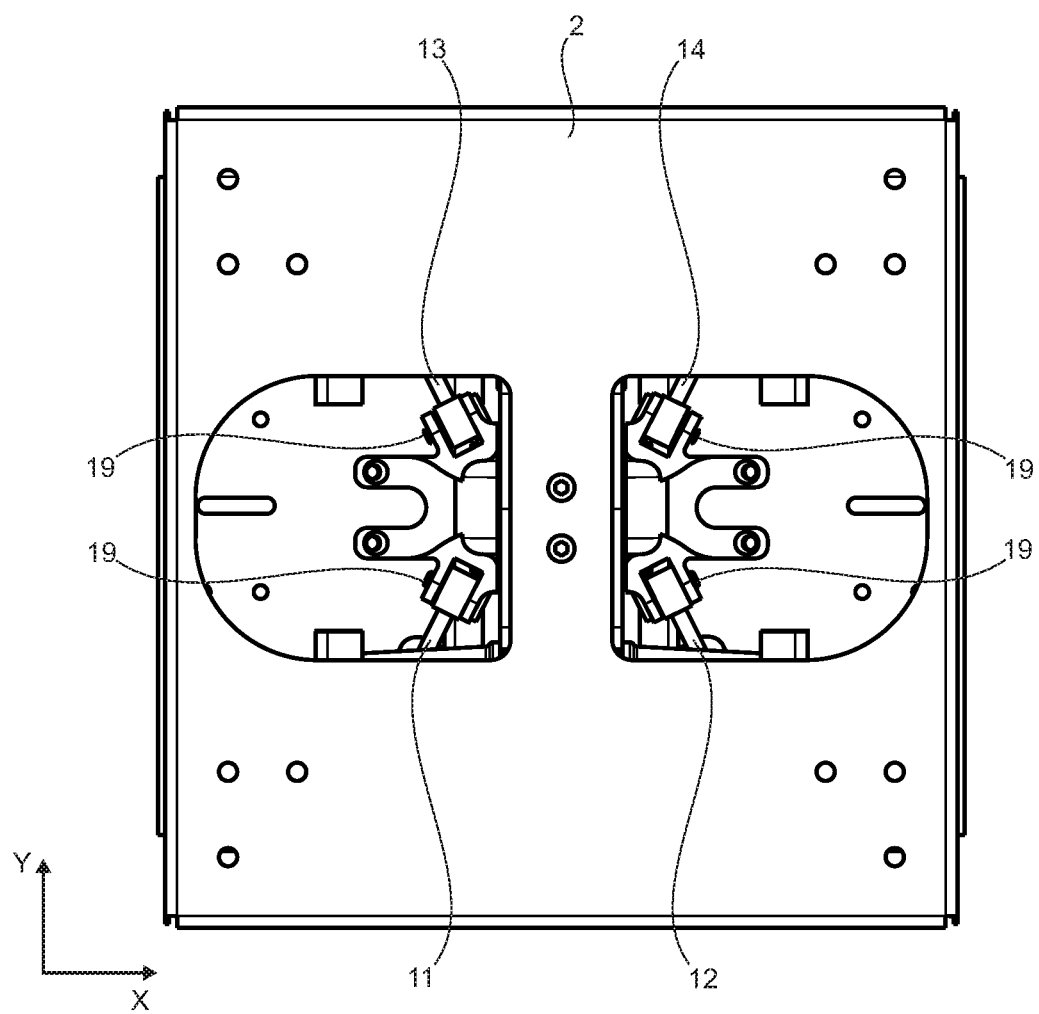
FIG. 14 is a top view of the vehicle seat in accordance with one embodiment.

A lever arm 31 can also be provided on the at least one inner swinging arm 5, 5a or the at least one outer swinging arm 6, 6a, the lever arm being connected to the at least one outer swinging arm 6, 6a or the at least one inner swinging arm 5, 5a via a second connecting element 32. The connecting element 32 has a length L. This length L is shown in FIGS. 12 and 13. The second connecting element 32 is not shown, however. As can be seen from these drawings, the length L changes with the corresponding tilting of the vehicle seat upper part 2. A second connecting element 32 whose length cannot be changed would accordingly prevent a pitching movement of the vehicle seat upper part 2. A second connecting element 32, the length of which can be modified or the length L of which can be adjusted by means of an actuator, could thus be used to adjust the inclination of the vehicle seat upper part 2 or the tilting of the vehicle seat upper part (2) about a pitch axis (26).

In order to allow a corresponding resetting of the pitching movement, the rolling movement and the vertical movement, spring elements 49 can be arranged parallel to the damping elements 11, 12, 13, 14 between the first connecting element 7 and the vehicle seat lower part 3. The arrangement and the function of the spring elements 49 can be described analogously to the damper elements 11, 12, 13, 14 with the difference that a resetting operation is effected instead of the dissipative function. The spring elements 49 can also be arranged inclined relative to the first axis 15. FIG. 1 shows such spring elements 49 which are arranged so as to be inclined.

All features disclosed in the application documents are claimed as being substantial to the invention, provided that they are, individually or in combination, novel compared to the prior art.

LIST OF REFERENCE SIGNS

1 vehicle seat
2 vehicle seat upper part
3 vehicle seat lower part
4 scissor frame arrangement
5 at least one inner swinging arm
5a inner swinging arm pair
6 at least one outer swinging arm
6a outer swinging arm pair
7 connecting element
8 first axis of rotation
9 second axis of rotation
10 third axis of rotation
11 damping element
11a central axis of the damping element
12 damping element
12a central axis of the damping element
13 damping element
13a central axis of the damping element
14 damping element
14a central axis of the damping element
15 first axis
16 imaginary trapezoid
17 imaginary truncated pyramid
18 pivot axis
19 pivot axis
20 lower floating bearing of the outer swinging arm pair
21 lower floating bearing of the inner swinging arm pair
22 upper floating bearing of the outer swinging arm pair
23 upper floating bearing of the inner swinging arm pair
24 upper fixed bearing
25 lower fixed bearing
26 pitch axis
27 receiving element
28a lower bearing rollers
28b upper bearing rollers
29a lower bearing rollers
29b upper bearing rollers
30a lower guide element
30b upper guide element
31 lever arm
32 second connecting element
33a lower swinging arm bolt
33b upper swinging arm bolt
34a upper swinging arm bolt
34b lower swinging arm bolt
35 seat cushion
36 backrest
37 lever arm
38 fourth axis of rotation
39 lever arm
40 fifth axis of rotation
41 central bearing bores
42 further connecting element
43 receptacles of the connecting element
44 fastening element
45 receptacles
46 sliding element
47 sliding rail
48 holding element
49 spring element
A1 vector
A2 vector
A3 vector
A4 vector
K intersection region
L length
M central axis
Z height axis
X longitudinal axis
Y width axis
α angle of attack
β angle
γ angle

What is claimed is:
1. A vehicle seat, comprising:
a vehicle seat upper part; and
a vehicle seat lower part, wherein the vehicle seat upper part and the vehicle seat lower part are spaced apart from one another along a height axis and are connected to one another by means of a scissor frame arrangement, wherein the scissor frame arrangement includes at least one inner swinging arm and at least one outer swinging arm, wherein the at least one inner swinging arm and the at least one outer swinging arm are connected by a connecting element, and wherein four damping elements are provided, the four damping elements being arranged between the vehicle seat lower part and the connecting element, two damping elements in each case forming the legs of an imaginary trapezoid in a non-use position of the vehicle seat, at least two of the damping elements each extending, inclined at an angle of attack α, relative to a first axis parallel to the height axis.

2. A vehicle seat, comprising:
a vehicle seat, upper part; and
a vehicle seat lower part, wherein the vehicle seat upper part and the vehicle seat lower part are spaced apart from one another along a height axis and are connected to one another by means of a scissor frame arrangement, wherein the scissor frame arrangement includes at least one inner swinging arm and at least one outer swinging arm, wherein at least two damping elements are provided between the vehicle seat upper part and the vehicle seat lower part, the at least two damping elements each extending, inclined at an angle of attack α, relative to a first axis parallel to the height axis, wherein the at least one inner swinging arm and the at least one outer swinging arm are connected by a connecting element, and wherein the damping elements are arranged on the vehicle seat lower part so as to be pivotable about a respective pivot axis, the damping elements being arranged on the connecting element so as to be pivotable about a further respective pivot axis.

3. A vehicle seat, comprising:
a vehicle seat upper part;
a vehicle seat lower part; and
a connecting element, wherein the vehicle seat upper part and the vehicle seat lower part are spaced apart from one another along a height axis and are connected to one another by means of a scissor frame arrangement, wherein the scissor frame arrangement includes at least one inner swinging arm and at least one outer swinging arm wherein at least two damping elements are provided between the vehicle seat upper part and the vehicle seat lower part, the at least two damping elements each extending, inclined at an angle of attack α, relative to a first axis parallel to the height axis, wherein the connecting element is connected to the at least one outer swinging arm at a first axis of rotation, wherein the connecting element is connected to the at least one inner swinging arm at a second axis of rotation, wherein the at least one inner swinging arm and the at least one outer swinging arm intersect in an intersection region, the first axis of rotation and the second axis of rotation being arranged, at least in a non-use position, along the height axis above the intersection region or along the height axis below the intersection region, the first axis of rotation and the second axis of rotation having the same distance, at least in a non-use position, along the height axis to the vehicle seat lower part.

4. The vehicle seat according to claim 3, wherein the at least one inner swinging arm and the at least one outer swinging arm are arranged so as to be pivotable relative to the vehicle seat lower part about a third axis of rotation extending along a longitudinal direction.

5. The vehicle seat according to claim 1, wherein the connecting element can be rotated about a respective axis of rotation extending along a width direction relative to the at least one inner swinging arm and relative to the at least one outer swinging arm, and wherein the damping elements are arranged between the connecting element and the vehicle seat lower part.

6. The vehicle seat according to claim 3, wherein the at least one inner swinging arm and the at least one outer swinging arm are each arranged on the vehicle seat lower part by means of at least one lower floating bearing, the at least one inner swinging arm and the at least one outer swinging arm each being arranged on the vehicle seat upper part by means of at least one upper floating bearing, the at least one inner swinging arm or the at least one outer swinging arm being connected to the vehicle seat lower part by means of a fixed bearing, the at least one inner swinging arm or the at least one outer swinging arm being connected to the vehicle seat upper part by means of a further fixed bearing.

7. The vehicle seat according to claim 3, wherein during a vertical movement of the vehicle seat upper part relative to the vehicle seat lower part, the connecting element is displaced along the height axis, the angle of attack α of the damping elements being dependent on a vertical position of the vehicle seat upper part relative to the vehicle seat lower part, the angle of attack α extending between a central axis of the respective damping element and the first axis of rotation and being selected from a range between 10° and 80°.

8. The vehicle seat according to claim 4, wherein in the event of a pitching movement, the vehicle seat upper part is tilted about a pitch axis relative to the vehicle seat lower part, the connecting element being rotated about the first axis of rotation and about the second axis of rotation during this pitching movement, the at least one inner swinging arm, the at least one outer swinging arm and the vehicle seat upper part being pivoted about the third axis of rotation relative to the vehicle seat lower part during a rolling movement.

9. The vehicle seat according to claim 8, wherein the damping elements dampen the vertical movement of the vehicle seat upper part relative to the vehicle seat lower part, the pitching movement of the vehicle seat upper part about the pitch axis relative to the vehicle seat lower part, and the rolling movement of the vehicle seat upper part about the third axis of rotation relative to the vehicle seat lower part.

10. The vehicle seat according to claim 6, wherein the lower floating bearings of the at least one inner swinging arm and the at least one outer swinging arm comprise at least one receiving element, the at least one receiving element being pivotable about the third axis of rotation relative to the vehicle seat lower part, the lower floating bearings comprising bearing rollers, the at least one receiving element being formed as a guide element, in which bearing rollers are guided along the longitudinal direction.

11. The vehicle seat according to claim 3, wherein a lever arm is provided on the at least one inner swinging arm or the at least one outer swinging arm, the lever arm being connectable to the at least one outer swinging arm or the at least one inner swinging arm via a second connecting element, the second connecting element being modifiable in its length, the tilting of the vehicle seat upper part about a pitch axis relative to the vehicle seat lower part being determinable by the length of the second connecting element.

12. The vehicle seat according to claim 2, wherein the connecting element can be rotated about a respective axis of rotation extending along a width direction relative to the at least one inner swinging arm and relative to the at least one outer swinging arm, and wherein the at least two damping elements are arranged between the connecting element and the vehicle seat lower part.

13. The vehicle seat according to claim 3, wherein the connecting element can be rotated about a respective axis of rotation extending along a width direction relative to the at least one inner swinging arm and relative to the at least one outer swinging arm, and wherein the at least two damping elements are arranged between the connecting element and the vehicle seat lower part.

* * * * *